(12) United States Patent
Chun

(10) Patent No.: US 11,126,547 B2
(45) Date of Patent: Sep. 21, 2021

(54) MEMORY CONTROLLER, MEMORY SYSTEM HAVING THE SAME, AND METHOD OF OPERATING MEMORY SYSTEM

(71) Applicant: SK hynix Inc., Gyeonggi-do (KR)

(72) Inventor: Dong Yeob Chun, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/162,753

(22) Filed: Oct. 17, 2018

(65) Prior Publication Data

US 2019/0286557 A1    Sep. 19, 2019

(30) Foreign Application Priority Data

Mar. 16, 2018  (KR) ........................ 10-2018-0031090

(51) Int. Cl.
*G06F 12/02* (2006.01)
*G06F 12/1009* (2016.01)
*G06F 3/06* (2006.01)

(52) U.S. Cl.
CPC ........ *G06F 12/0292* (2013.01); *G06F 3/0604* (2013.01); *G06F 3/0658* (2013.01); *G06F 3/0673* (2013.01); *G06F 12/1009* (2013.01)

(58) Field of Classification Search
None
See application file for complete search history.

(56) References Cited

U.S. PATENT DOCUMENTS

| | | | | |
|---|---|---|---|---|
| 7,657,696 B2* | 2/2010 | Su | ........................... | G11C 16/20 |
| | | | | 711/103 |
| 7,991,990 B2* | 8/2011 | Chung | .................. | G06F 9/4403 |
| | | | | 711/103 |
| 9,189,386 B2* | 11/2015 | Wakrat | ................ | G06F 12/0246 |
| 2019/0129837 A1* | 5/2019 | Kwon | ................. | G06F 12/0246 |

FOREIGN PATENT DOCUMENTS

KR    100648243    11/2006

* cited by examiner

*Primary Examiner* — Michael Alsip
(74) *Attorney, Agent, or Firm* — IP & T Group LLP

(57) ABSTRACT

A memory controller includes a central processing unit (CPU) configured to translate a logical address corresponding to an operation that is to be performed by a memory device into a physical address, and an addressing component configured to acquire information about an addressing rule supported by the memory device, among a plurality of addressing rules, and to configure an addressing table corresponding to the operation using the acquired addressing rule information and the physical address.

19 Claims, 13 Drawing Sheets

FIG. 8

| | ADDRESSING RULE | | | | | | | | | | |
|---|---|---|---|---|---|---|---|---|---|---|---|
| Column address | | Page address | | Plane address | | Block address | | LUN address | | Address bus cycle |
| Length | 16 bits | Length | 12 bits | Length | 4 bits | Length | 14 bits | Length | 2 bits | 6 cycles |
| Position | A[15:0] | Position | A[27:16] | Position | A[31:28] | Position | A[45:32] | Position | A[47:46] | |

FIG. 9

| Address bus cycle | DQ0 | DQ1 | DQ2 | DQ3 | DQ4 | DQ5 | DQ6 | DQ7 | |
|---|---|---|---|---|---|---|---|---|---|
| 1st cycle | A0 | A1 | A2 | A3 | A4 | A5 | A6 | A7 | |
| 2nd cycle | A8 | A9 | A10 | A11 | A12 | A13 | A14 | A15 | — Column |
| 3rd cycle | A16 | A17 | A18 | A19 | A20 | A21 | A22 | A23 | — Page |
| 4th cycle | A24 | A25 | A26 | A27 | A28 | A29 | A30 | A31 | — Plane |
| 5th cycle | A32 | A33 | A34 | A35 | A36 | A37 | A38 | A39 | — Block |
| 6th cycle | A40 | A41 | A42 | A43 | A44 | A45 | A46 | A47 | — LUN |

FIG. 10

| PHYSICAL ADDRESS | |
|---|---|
| Page | 100 |
| Plane | 2 |
| Block | 4 |
| LUN | 0 |

⇒

| Address bus cycle | DQ0 | DQ1 | DQ2 | DQ3 | DQ4 | DQ5 | DQ6 | DQ7 | |
|---|---|---|---|---|---|---|---|---|---|
| 1st cycle | A0 | A1 | A2 | A3 | A4 | A5 | A6 | A7 | |
| 2nd cycle | A8 | A9 | A10 | A11 | A12 | A13 | A14 | A15 | — Column |
| 3rd cycle | 0 | 0 | 1 | 0 | 0 | 1 | 1 | 0 | — Page |
| 4th cycle | 0 | 0 | 0 | 0 | 0 | 1 | 0 | 0 | — Plane |
| 5th cycle | 0 | 0 | 1 | 0 | 0 | 0 | 0 | 0 | — Block |
| 6th cycle | 0 | 0 | 0 | 0 | 0 | 0 | 0 | 0 | — LUN |

FIG. 11

| ADDRESSING RULE | | | | | | | | | | | Address bus cycle |
|---|---|---|---|---|---|---|---|---|---|---|---|
| Column address | | Page address | | Plane address | | Block address | | LUN address | | | 5 cycles |
| Length | Position | Length | Position | Length | Position | Length | Position | Length | Position | | |
| 14 bits | A[13:0] | 10 bits | A[23:14] | 2 bits | A[25:24] | 10 bits | A[35:26] | 2 bits | A[37:36] | | |

FIG. 12

| Address bus cycle | DQ0 | DQ1 | DQ2 | DQ3 | DQ4 | DQ5 | DQ6 | DQ7 | |
|---|---|---|---|---|---|---|---|---|---|
| 1st cycle | A0 | A1 | A2 | A3 | A4 | A5 | A6 | A7 | —Column |
| 2nd cycle | A8 | A9 | A10 | A11 | A12 | A13 | L | L | —1202 |
| 3rd cycle | A14 | A15 | A16 | A17 | A18 | A19 | A20 | A21 | —Page |
| 4th cycle | A22 | A23 | A24 | A25 | A26 | A27 | A28 | A29 | —Block |
| 5th cycle | A30 | A31 | A32 | A33 | A34 | A35 | A36 | A37 | —LUN |

Plane

FIG. 13

| PHYSICAL ADDRESS | |
|---|---|
| Page | 100 |
| Plane | 2 |
| Block | 4 |
| LUN | 0 |

⇨

| Address bus cycle | DQ0 | DQ1 | DQ2 | DQ3 | DQ4 | DQ5 | DQ6 | DQ7 | |
|---|---|---|---|---|---|---|---|---|---|
| 1st cycle | A0 | A1 | A2 | A3 | A4 | A5 | A6 | A7 | |
| 2nd cycle | A8 | A9 | A10 | A11 | A12 | A13 | L | L | |
| 3rd cycle | 0 | 0 | 1 | 0 | 0 | 1 | 1 | 0 | —Page |
| 4th cycle | 0 | 0 | 0 | 1 | 0 | 0 | 1 | 0 | —Block |
| 5th cycle | 0 | 0 | 0 | 0 | 0 | 0 | 0 | 0 | —LUN |

Plane

MEMORY CONTROLLER, MEMORY SYSTEM HAVING THE SAME, AND METHOD OF OPERATING MEMORY SYSTEM

CROSS-REFERENCE TO RELATED APPLICATION

The present application claims priority under 35 U.S.C. § 119(a) to Korean patent application number 10-2018-0031090, filed on Mar. 16, 2018, which is incorporated herein by reference in its entirety.

BACKGROUND

1. Field of Invention

Various embodiments of the present disclosure relate to a memory controller, a memory system having the memory controller, and a method of operating the memory system, and more particularly, to such system, controller, and method that can perform addressing depending on the type of a memory device.

2. Description of Related Art

A memory system may include a memory device and a memory controller.

The memory device may store data and output stored data under the control of the memory controller. The memory device may be implemented as a volatile memory device in which stored data is lost when the supply of power is interrupted or as a nonvolatile memory device in which stored data is retained even when the supply of power is interrupted.

The memory controller may control data communication between a host and the memory device.

The host is capable of communicating with the memory system using any of various interface protocols, such as Peripheral Component Interconnect-Express (PCI-e or PCIe), Advanced Technology Attachment (ATA), Serial ATA (SATA), Parallel ATA (PATA) or Serial Attached SCSI (SAS). Communication between the host may communicate and the memory system may also be carried out using any of various interfaces, such as Universal Serial Bus (USB), Multi-Media Card (MMC), Enhanced Small Disk Interface (ESDI), and Integrated Drive Electronics (IDE).

SUMMARY

Various embodiments of the present disclosure are directed to a memory controller, a memory system having the memory controller, and a method of operating the memory system, which can perform addressing depending on the type of a memory device.

An embodiment of the present disclosure provides for a memory controller. The memory controller includes a central processing unit (CPU) configured to translate a logical address corresponding to an operation that is to be performed by a memory device into a physical address, and an addressing component configured to acquire information about an addressing rule supported by the memory device, among a plurality of addressing rules, and to configure an addressing table corresponding to the operation using the acquired addressing rule information and the physical address.

An embodiment of the present disclosure provides for a memory system. The memory system includes a memory device, and a memory controller configured to acquire information about an addressing rule supported by the memory device, among a plurality of addressing rules, and to configure an addressing table, corresponding to an operation that is to be performed by the memory device, using the acquired addressing rule information.

An embodiment of the present disclosure provides for a method of operating a memory system. The method includes translating a logical address corresponding to an operation that is to be performed by a memory device into a physical address by using a processor of the memory system, acquiring information about an addressing rule supported by the memory device, among a plurality of addressing rules by using an addressing component of the memory system, and configuring an addressing table corresponding to the operation using the physical address and the acquired addressing rule information by using the addressing component.

An embodiment of the present disclosure provides for a memory system. The memory system includes a memory device, and a memory controller configured to receive a logical address for the memory device, translate the logical address to a physical address including a column address and a row address for a space in the memory device, configure an addressing table based on an addressing rule, and access the memory device based on the addressing table, wherein the addressing table includes information regarding bits of the column address and the row address to access the memory device at each of a plurality of address bus cycles.

BRIEF DESCRIPTION OF THE DRAWINGS

FIG. 8 is a diagram illustrating an example of an addressing rule acquired from a memory device.

FIG. 9 is a diagram illustrating the exemplary addressing rule, illustrated in FIG. 8, in the form of a table.

FIG. 10 is a diagram illustrating an addressing table configured according to the exemplary addressing rule illustrated in FIGS. 8 and 9.

FIG. 11 is a diagram illustrating an example of an addressing rule acquired from a memory device.

FIG. 12 is a diagram illustrating the exemplary addressing rule, illustrated in FIG. 11, in the form of a table.

FIG. 13 is a diagram illustrating an example of an addressing table configured according to the exemplary addressing rule illustrated in FIGS. 11 and 12.

DETAILED DESCRIPTION

Advantages and features of the present disclosure, and methods for achieving the same will be described in the context of embodiments described in detail below together with the accompanying drawings. However, aspects of the present disclosure may be configured or arranged differently than shown and described below. Thus, the present invention is not limited to the disclosed embodiments. Rather, these embodiments are provided so that the present disclosure is thorough and complete and fully conveys the disclosure to those skilled in the art. Also, it is noted that reference to "an embodiment" or the like is not necessarily to only one embodiment, and different references to any such phrase are not necessarily to the same embodiment(s).

It is also noted that in this specification, "connected/coupled" refers to one component not only directly coupling another component but also indirectly coupling another component through one or more intermediate components. Moreover, such direct or indirect connection or coupling may be wired or wireless, unless the context indicates otherwise. In the specification, when an element is referred to as "comprising" or "including" a component, it does not preclude the presence or addition of one or more other components but may further include such other component(s), unless the context clearly indicates otherwise.

Figure 1:
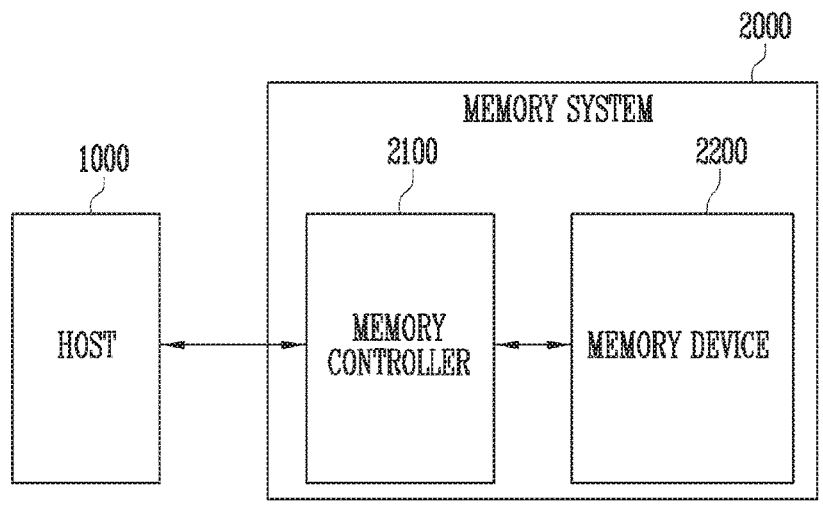
FIG. 1 is a diagram illustrating a memory system in accordance with an embodiment of the present disclosure.

FIG. 1 is a diagram illustrating a memory system 2000 in accordance with an embodiment of the present disclosure.

Referring to FIG. 1, the memory system 2000 may include a memory device 2200 which stores data, and a memory controller 2100 which controls the memory device 2200 under the control of a host 1000.

The host 1000 is capable of communicating with the memory system 2000 using an interface protocol, such as Peripheral Component Interconnect-Express (PCI-e or PCIe), Advanced Technology Attachment (ATA), Serial ATA (SATA), Parallel ATA (DATA) or Serial Attached SCSI (SAS). Interface protocols used between the host 1000 and the memory system 2000 are not limited to the above-described examples; Universal Serial Bus (USB), Multi-Media Card (MMC), Enhanced Small Disk Interface (ESDI), or Integrated Drive Electronics (IDE) interface protocols may also be used.

The memory controller 2100 may control the overall operation of the memory system 2000, and may control data exchange between the host 1000 and the memory device 2200. Specifically, the memory controller 2100 may convert (or translate) received information and store and output the converted information so that commands, addresses, and data may be exchanged between the host 1000 and the memory device 2200. For example, during a program operation, the memory controller 2100 may transmit commands, addresses, and data to the memory device 2200.

The memory controller 2100 may perform addressing depending on the type of the memory device 2200 when controlling the operation of the memory device 2200.

The memory controller 2100 may configure an addressing table according to an addressing rule supported by the memory device 2200, among a plurality of addressing rules. The memory controller 2100 may address the memory device 2200 based on the configured addressing table.

The addressing rule may include information about an address bus cycle supported by the memory device 2200 and information about the number of bits allocated to represent an address and bit positions representing the address.

For example, the memory device 2200 may use five or six cycles or other suitable number of cycles as the address bus cycle. The address bus cycle may vary according to the type of the memory device 2200.

In various embodiments, the plurality of addressing rules may represent that a number of bits having different lengths are allocated to represent addresses or that bits representing the corresponding address are allocated to different positions. For example, any one of the plurality of addressing rules indicates that a 10-bit length is allocated to represent a column address, and another one indicates that a 12-bit length is allocated to represent a column address. For another example, any one of the plurality of addressing rules indicates that bits representing a column address are allocated to positions ranging from A0 to A10, and another one indicates that bits representing a column address are allocated to positions ranging from A0 to A12.

The memory controller 2100 may acquire an addressing rule supported by the memory device 2200, and may configure an addressing table using the acquired addressing rule. The addressing table corresponds to an operation that is to be performed by the memory device 2200. That is, the memory controller 2100 may configure an addressing table according to any of multiple addressing rules supported by the memory device.

The memory controller 2100 may acquire information about the cell type of the memory device 2200, and may configure the addressing table using the acquired cell type information. In various embodiments, the memory controller 2100 may configure the addressing table depending on whether the cell type of the memory device 2200 is a single-level cell (SLC) type, multi-level cell (MLC) type or a triple-level cell (TLC) type. The memory device 2200 may be classified into an SLC type of memory device, an MLC type of memory device, and an TLC type of memory device, depending on the number of bits stored in each memory cell. When the memory device 2200 is of the SLC type, one bit of data may be stored in one memory cell. In the memory device 2200 of the MLC type, two bits of data may be stored in one memory cell. In the memory device 2200 of the TLC type, three bits of data may be stored in one memory cell. In addition, the memory device 2200 may be configured in various types depending on the number of bits stored in one memory cell. The memory controller 2100 may calculate a page address depending on the cell type of the memory device 2200, and may configure the addressing table based on the result of calculation.

The memory controller 2100 may configure the addressing table using information about a column address management size. For example, the memory controller 2100 calculates a column address depending on what the column address management size is, and may configure the addressing table based on the result of calculation.

The addressing table is configured using addresses corresponding to the operation that is to be performed by the memory device 2200. The addressing table may indicate a cycle, in which a column address and a row address are to be transmitted, and the number and positions of bits representing the corresponding address.

The memory device 2200 may perform a program operation, a read operation, an erase operation, a data compression operation, and a copy-back operation under the control of the memory controller 2100. The memory device 2200 may be implemented as a volatile memory device or as a nonvolatile memory device.

Figure 2:
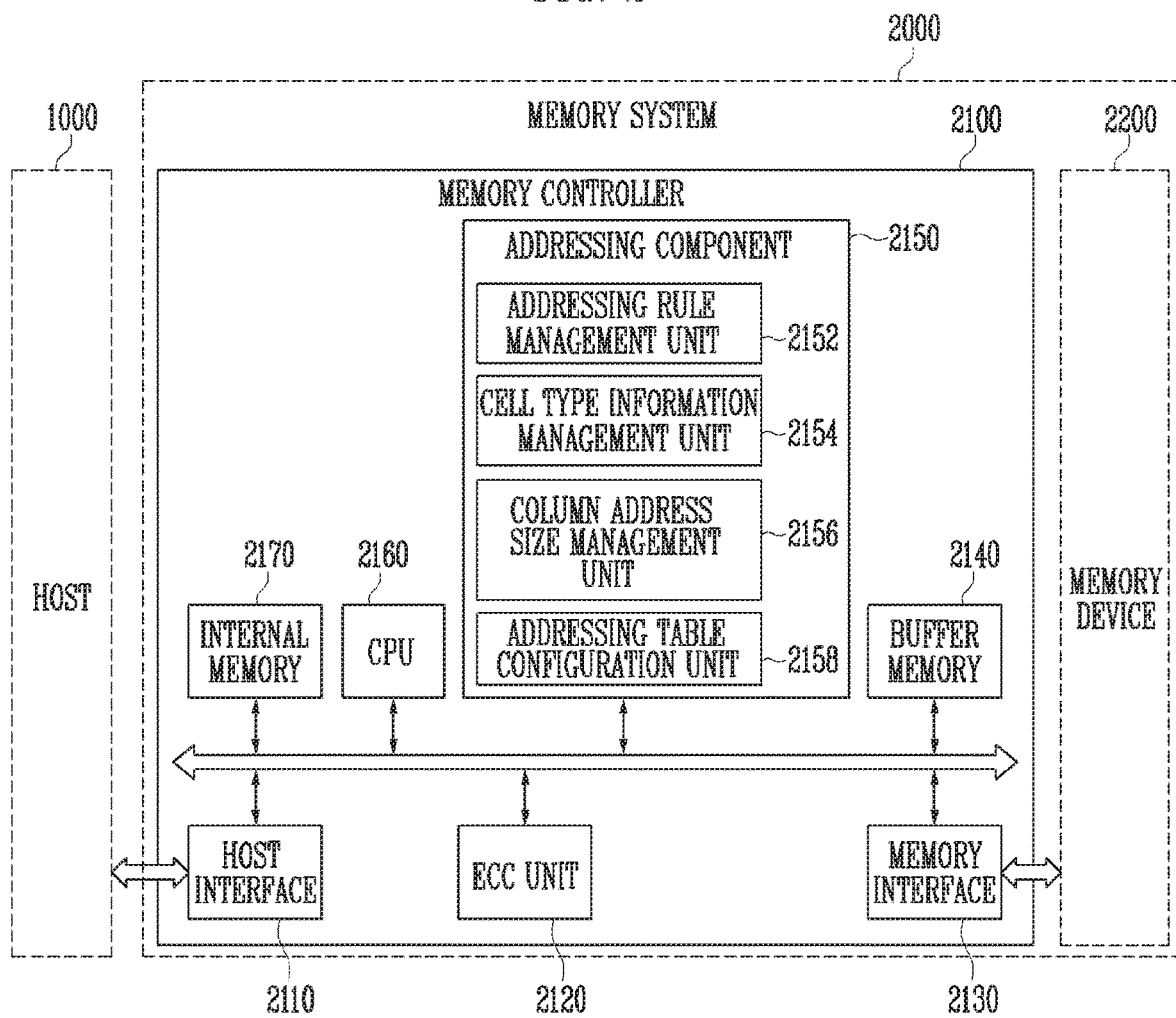
FIG. 2 is a diagram illustrating a memory controller in accordance with an embodiment of the present disclosure.

FIG. 2 is a diagram illustrating a memory controller in accordance with an embodiment of the present disclosure, for example, the memory controller illustrated in FIG. 1.

Referring to FIG. 2, the memory controller 2100 may include a host interface 2110, an error correcting code (ECC) unit 2120, a memory interface 2130, a buffer memory 2140, an addressing component 2150, a central processing unit (CPU) 2160, and an internal memory 2170. The host interface 2110, the ECC unit 2120, the memory interface 2130, the buffer memory 2140, the addressing component 2150, and the internal memory 2170 may be controlled by the CPU 2160.

The host interface 2110 may perform data exchange with a host 1000 using a communication protocol.

The ECC unit 2120 may detect an error and correct the detected error during a program operation or a read operation.

The memory interface 2130 may communicate with the memory device 2200 using a communication protocol.

The buffer memory 2140 may temporarily store data while the memory controller 2100 controls the memory device 2200. For example, data received from the host may be temporarily stored in the buffer memory 2140 until the program operation is completed. During a read operation, data read from the memory device 2200 may also be temporarily stored in the buffer memory 2140.

The addressing component 2150 may configure the addressing table according to an addressing rule supported by the memory device 2200, among a plurality of addressing rules. When controlling the operation of the memory device 2200, the addressing component 2150 may perform addressing based on the configured addressing table. Further, the addressing component 2150 may configure the addressing table by additionally considering at least one of information about the cell type of the memory device 2200 and information about the column address management size of the memory controller 2100. The addressing component 2150 may include other modules or units to perform the various operations of the addressing component 2150. Such modules or units include an addressing rule management unit 2152, a cell type information management unit 2154, a column address size management unit 2156, and an addressing table configuration unit 2158. The addressing component 2150 and its constituent modules or units may be implemented in hardware, software, firmware or suitable combination thereof.

The addressing rule management unit 2152 may manage an addressing rule supported by the memory device 2200, among the plurality of addressing rules. The addressing rule supported by the memory device 2200 may be received from either the CPU 2160 or the memory device 2200. The addressing rule may include information about an address bus cycle supported by the memory device 2200 and information about the number of bits allocated to represent an address and bit positions representing the address.

The cell type information management unit 2154 may manage information about the cell type of the memory device 2200. For example, the cell type information management unit 2154 manages information about whether a cell type used in the memory device 2200 is an SLC type, an MLC type or a TLC type. Information about the cell type of the memory device 2200 may be received from either the CPU 2160 or the memory device 2200.

The column address size management unit 2156 may manage information about the column address management size of the memory controller 2100. In various embodiments, the memory controller 2100 manages column addresses at different sizes depending on the type of the host 1000. For example, the memory controller 2100 manages column addresses by the unit of 512 bytes or by the unit of 2 Kbytes. The information about the column address management size may be received from the CPU 2160.

The addressing table configuration unit 2158 may configure an addressing table corresponding to the operation that is to be performed by the memory device 2200 using physical page addresses received from the CPU 2160. In various embodiments, the addressing table configuration unit 2158 may configure the addressing table based on at least one of the addressing rule, the cell type information, and the column address management size information.

In an embodiment, the addressing table configuration unit 2158 translates individual addresses in conformity with the addressing rule, and inserts the translated addresses into positions corresponding to the addresses.

In an embodiment, the addressing table configuration unit 2158 translates row addresses received from the CPU 2160 depending on the cell type information of the memory device 2200. For example, the addressing table configuration unit 2158 translates page addresses received from the CPU 2160 in accordance with the corresponding cell type depending on what the cell type of the memory device 2200 is.

In an embodiment, the addressing table configuration unit 2158 translates column addresses received from the CPU 2160 depending on the column address management size information. For example, the addressing table configuration unit 2158 translates column addresses received from the CPU 2160 in accordance with the corresponding column address management size depending on what the column address management size is.

The addressing table configuration unit 2158 may address the memory device 2200 based on the configured addressing table.

The CPU 2160 may perform various types of calculations or generate commands and addresses so as to control the memory device 2200. For example, the CPU 2160 generates various commands required for a program operation, a read operation, an erase operation, a data compression operation, and copy-back operations.

The CPU 2160 may translate logical addresses received from the host 1000 into physical addresses and transmit the physical addresses to the addressing component 2150 so as to control the operation of the memory device 2200. In an embodiment, the CPU 2160 may translate logical addresses into physical addresses or translate physical addresses into logical addresses by utilizing an address mapping table stored in the buffer memory 2140. In an embodiment, the CPU 2160 may receive information about the addressing rule supported by the memory device 2200 and/or information about the cell type of the memory device 2200 from the memory device 2200, and may transmit the received information to the addressing component 2150. In an embodiment, the CPU 2160 may transmit the column address management size information of the memory controller 2100 to the addressing component 2150.

The internal memory 2170 may be used as a storage which stores various types of information required for the operation of the memory controller 2100. The internal memory 2170 may store a plurality of tables. For example, the internal memory 2170 stores a mapping table between logical addresses and physical addresses.

Figure 3:
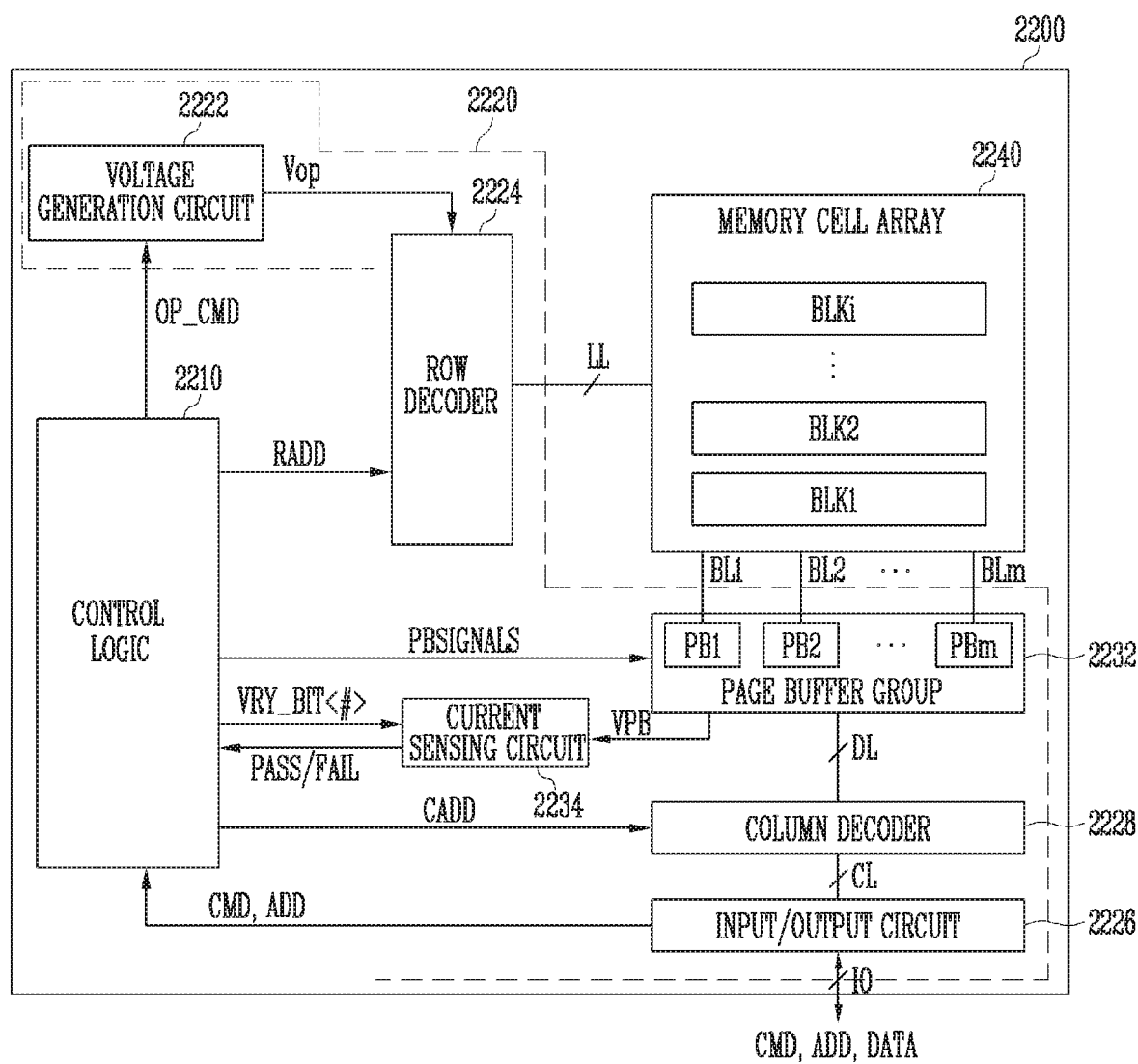
FIG. 3 is a diagram illustrating a memory device in accordance with an embodiment of the present disclosure.

FIG. 3 is a diagram illustrating a memory device 2200 in accordance with an embodiment of the present disclosure. The memory device 2200 illustrated in FIG. 3 may be applied to the memory system illustrated in FIGS. 1 and 2.

Referring to FIG. 3, the memory device 2200 may include control logic 2210, a peripheral circuit 2220 and a memory cell array 2240. The memory cell array 2240 may include a plurality of memory blocks BLK1 to BLKi. The peripheral circuit 2220 may include a voltage generation circuit 2222, a row decoder 2224, an input/output circuit 2226, a column decoder 2228, a page buffer group 2232, and a current sensing circuit 2234.

The control logic 2210 may control the peripheral circuit 2220 under the control of the memory controller 2100 illustrated in FIG. 2.

The control logic 2210 may control the peripheral circuit 2220 in response to a command CMD and an address ADD that are received from the memory controller 2100 through the input/output circuit 2226. For example, the control logic 2210 may output an operation signal OP_CMD, a row address RADD, page buffer control signals PBSIGNALS, and an enable bit VRY_BIT<#> in response to the command CMD and the address ADD. The control logic 2210 may determine whether a verify operation has passed or failed in response to a pass or fail signal PASS or FAIL received from the current sensing circuit 2234.

The peripheral circuit 2220 may perform a program operation of storing data in the memory cell array 2240, a read operation of outputting data stored in the memory cell array 2240, and an erase operation of erasing data stored in the memory cell array 2240.

The voltage generation circuit 2222 may generate various operating voltages Vop that are used for the program, read, and erase operations in response to the operation signal OP_CMD received from the control logic 2210. For example, the voltage generation circuit 2222 transfers a program voltage, a verify voltage, a pass voltage, a compensation program voltage, a read voltage, an erase voltage, and a turn-on voltage to the row decoder 2224.

The row decoder 2224 may transfer the operating voltages Vop to local lines LL that are coupled to a memory block selected from among memory blocks included in the memory cell array 2240 in response to the row address RADD received from the control logic 2210. The local lines LL may include local word lines, local drain select lines, and local source select lines. In addition, the local lines LL may include various lines, such as source lines, coupled to memory blocks.

The input/output circuit 2226 may transfer the command CMD and the address ADD, received from an external device, e.g., the memory controller 2100 of FIG. 2 through input/output (IO) lines, to the control logic 2210, or may exchange data with the column decoder 2228.

The column decoder 2228 may transfer data between the input/output circuit 2226 and the page buffer group 2232 in response to a column address CADD received from the control logic 2210. For example, the column decoder 2228 exchanges data with page buffers PB1 to PBm through data lines DL or may exchange data with the input/output circuit 2226 through column lines CL.

The page buffer group 2232 may be coupled to bit lines BL1 to BLm coupled in common to the memory blocks BLK1 to BLKi. The page buffer group 2232 may include a plurality of page buffers PB1 to PBm coupled to the bit lines BL1 to BLm, respectively. For example, one page buffer is coupled to each bit line. The page buffers PB1 to PBm may be operated in response to the page buffer control signals PBSIGNALS received from the control logic 2210. During a program operation, the page buffers PB1 to PBm may temporarily store program data received from the memory controller 2100 through the input/output lines IO, the column lines CL and the data lines DL, and may control voltages to be applied to the bit lines BL1 to BLm based on the program data. During a read operation, the page buffers PB1 to PBm may temporarily store data received from the memory cell array 2240 through the bit lines BL1 to BLm or may sense voltages or currents of the bit lines BL1 to BLm. In case of the memory cell array 2240 including a plurality of planes, each of the planes including a plurality of memory blocks, the page buffer group 2232 may be arranged in each of planes to correspond thereto.

During a read operation or a verify operation, the current sensing circuit 2234 may generate a reference current in response to the enable bit VRY_BIT<#> received from the control logic 2210, and may compare a reference voltage, generated by the reference current, with a sensing voltage VPB, received from the page buffer group 2232, and then output a pass signal PASS or a fail signal FAIL.

The memory cell array 2240 may include the plurality of memory blocks BLK1 to BLKi in which data is stored. In the memory blocks BLK1 to BLKi, user data and various types of information required for the operation of the memory device 2200 may be stored. The memory blocks BLK1 to BLKi may each be implemented as a two-dimensional (2D) structure or a three-dimensional (3D) structure, and may be equally configured.

Figure 4:
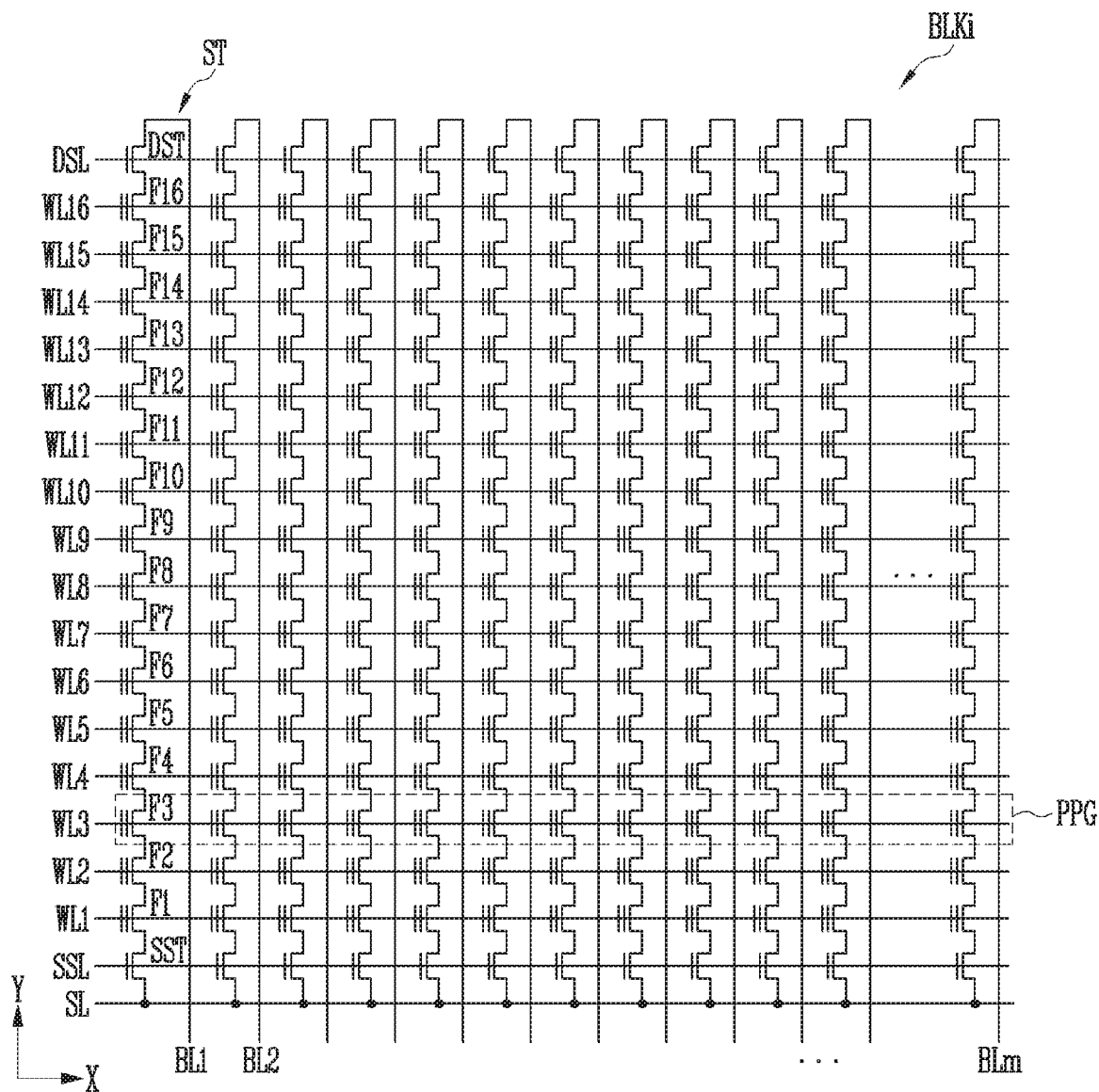
FIG. 4 is a diagram illustrating an exemplary memory block.

FIG. 4 is a diagram illustrating a memory block.

A memory cell array may include a plurality of memory blocks, and any one memory block BLKi of the plurality of memory blocks is illustrated in FIG. 4 by way of example.

Referring to FIG. 4, a plurality of word lines arranged in parallel between a first select line and a second select line may be coupled to the memory block BLKi. Here, the first select line may be a source select line SSL, and the second select line may be a drain select line DSL. In detail, the memory block BLKi may include a plurality of strings ST coupled between bit lines BL1 to BLm and a source line SL. The bit lines BL1 to BLm may be coupled to the strings ST, respectively, and the source line SL may be coupled in common to the strings ST. Each of the strings ST may be configured the same way, and thus the string ST coupled to the first bit line BL1 will be described in detail by way of example.

The string ST may include a source select transistor SST, a plurality of memory cells F1 to F16, and a drain select transistor DST which are coupled in series between the source line SL and the first bit line BL1. A single string ST may include at least one source select transistor SST and at least one drain select transistor DST, and more than the sixteen (16) memory cells (F1 to F16) illustrated in the drawing may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells F1 to F16 may be coupled to a plurality of word lines WL1 to WL16, respectively. A group of memory cells coupled to the same word line, among the memory cells in different strings ST, may be referred to as a "physical page: PPG". Therefore, the memory block BLKi may include a number of physical pages PPG identical to the number of word lines WL1 to WL16.

When one memory cell stores one bit of data, i.e., a single-level cell (SLC), one physical page PPG may store data corresponding to one logical page LPG. The data corresponding to one logical page LPG may include a number of data bits identical to the number of cells included in one physical page PPG. For example, when two or more bits of data are stored in one memory cell, one physical page PPG may store data corresponding to two or more logical pages LPG. For example, in a memory device driven in an MLC type, data corresponding to two logical pages may be stored in one physical page PPG. In a memory device driven in a TLC type, data corresponding to three logical pages may be stored in one physical page PPG.

Figure 5:
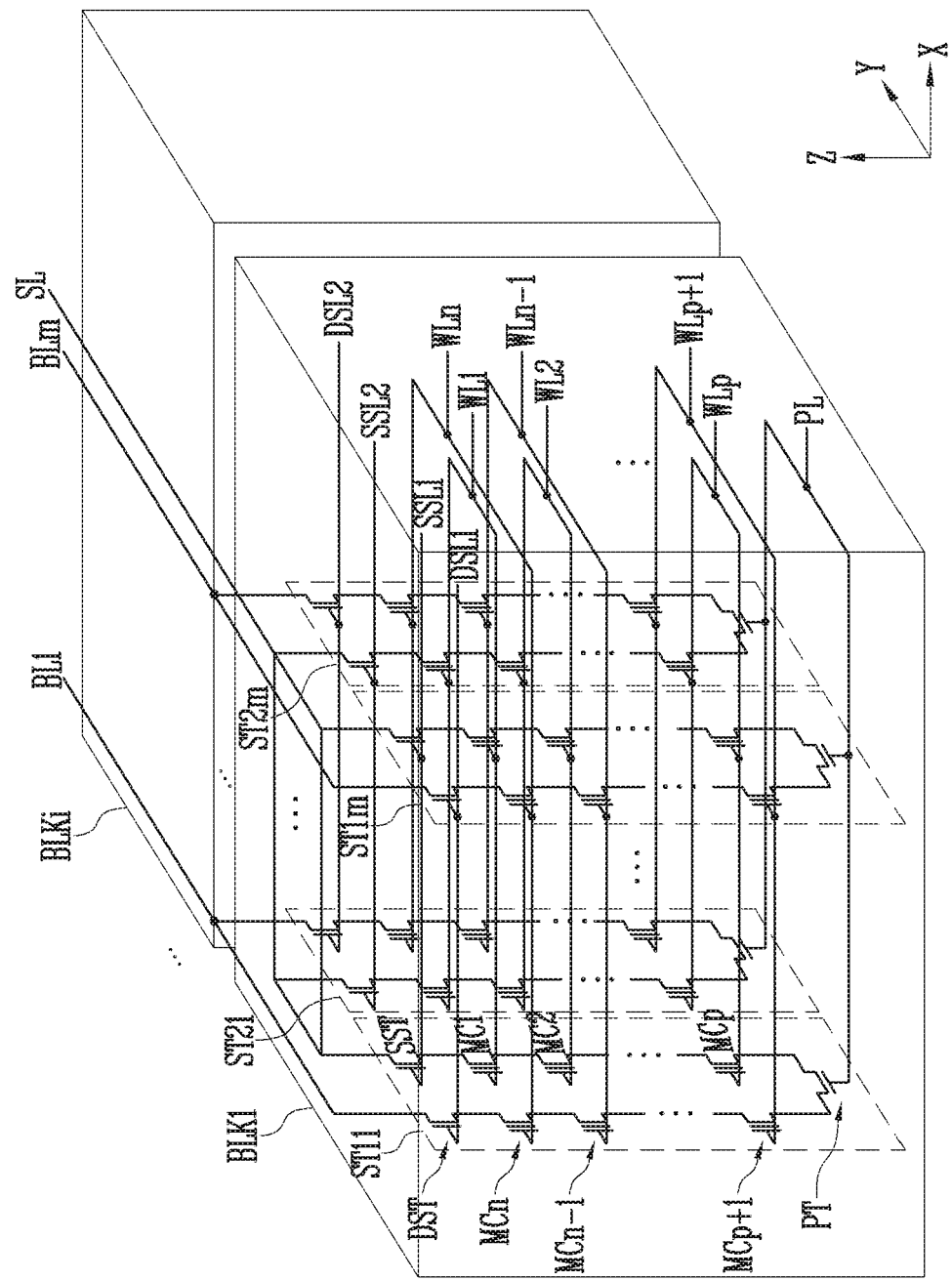
FIG. 5 is a diagram illustrating an example of a memory block having a three-dimensional (3D) structure.

FIG. 5 is a diagram illustrating an example of a memory block having a three-dimensional (3D) structure.

Referring to FIG. 5, a memory cell array 2240 of FIG. 3 may include a plurality of memory blocks BLK1 to BLKi. The first memory block BLK1, which is described by way of example, may include a plurality of strings ST11 to ST1m and ST21 to ST2m. In an embodiment, each of the strings ST11 to ST1m and ST21 to ST2m may be formed in a 'U' shape. In the first memory block BLK1, m strings may be arranged in a row direction (e.g., X direction). In FIG. 5, two strings are illustrated as being arranged in a column direction (e.g., Y direction), but this is simply an example and for clarity of illustration; three or more strings may be arranged in the column direction (e.g., Y direction) in other embodiments.

Each of the plurality of strings ST11 to Slim and ST21 to ST2m may include at least one source select transistor SST, first to n-th memory cells MC1 to MCn, a pipe transistor PT, and at least one drain select transistor DST.

The source and drain select transistors SST and DST and the memory cells MC1 to MCn may have a similar structure. For example, each of the source and drain select transistors SST and DST and the memory cells MC1 to MCn may include a channel layer, a tunnel insulating layer, a charge trap layer, and a blocking insulating layer. For example, a pillar for providing the channel layer may be provided in each string. For example, a pillar for providing at least one of the channel layer, the tunnel insulating layer, the charge trap layer, and the blocking insulating layer may be provided in each string.

The source select transistor SST of each string may be coupled between a source line SL and memory cells MC1 to MCp.

In an embodiment, source select transistors of strings arranged in the same row may be coupled to a source select line extending in the row direction, and source select transistors of strings arranged in different rows may be coupled to different source select lines. In FIG. 5, the source select transistors of the strings ST11 to Slim in a first row may be coupled to a first source select line SSL1. The source select transistors of the strings ST21 to ST2m in a second row may be coupled to a second source select line SSL2.

In other embodiments, the source select transistors of the strings ST11 to ST1m and ST21 to ST2m may be coupled in common to one source select line.

The first to n-th memory cells MC1 to MCn in each string may be coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp may be sequentially arranged in a vertical direction (e.g., Z direction), and may be coupled in series between the source select transistor SST and the pipe transistor PT. The p+1-th to n-th memory cells MCp+1 to MCn may be sequentially arranged in the vertical direction (e.g., Z direction), and may be coupled in series between the pipe transistor PT and the drain select transistor DST. The first to p-th memory cells MC1 to MCp and the p+1-th to n-th memory cells MCp+1 to MCn may be coupled to each other through the pipe transistor PT. Gates of the first to n-th memory cells MC1 to MCn in each string may be coupled to first to n-th word lines WL1 to WLn, respectively.

In an embodiment, at least one of the first to n-th memory cells MC1 to MCn may be used as a dummy memory cell. When a dummy memory cell is provided, the voltage or current of the corresponding string may be stably controlled. A gate of the pipe transistor PT of each string may be coupled to a pipeline PL.

The drain select transistor DST of each string may be coupled between the corresponding bit line and the memory cells MCp+1 to MCn. Strings arranged in the row direction may be coupled to the corresponding drain select line extending in the row direction. The drain select transistors of the strings ST11 to ST1m in the first row may be coupled to a drain select line DSL1. The drain select transistors of the strings ST21 to ST2m in the second row may be coupled to a second drain select line DSL2.

The strings arranged in the column direction may be coupled to bit lines extending in the column direction. In FIG. 5, the strings ST11 and ST21 in a first column may be coupled to a first bit line BL1. The strings ST1m and ST2m in an m-th column may be coupled to an m-th bit line BLm.

Among strings arranged in the row direction, memory cells coupled to the same word line may constitute one page. For example, memory cells coupled to the first word line WL1, among the strings ST11 to ST1m in the first row, may constitute one page. Among the strings ST21 to ST2m in the second row, memory cells coupled to the first word line WL1 may constitute one additional page. Strings arranged in the direction of one row may be selected by selecting any one of the drain select lines DSL1 and DSL2. One page may be selected from the selected strings by selecting any one of the word lines WL1 to WLn.

Figure 6:
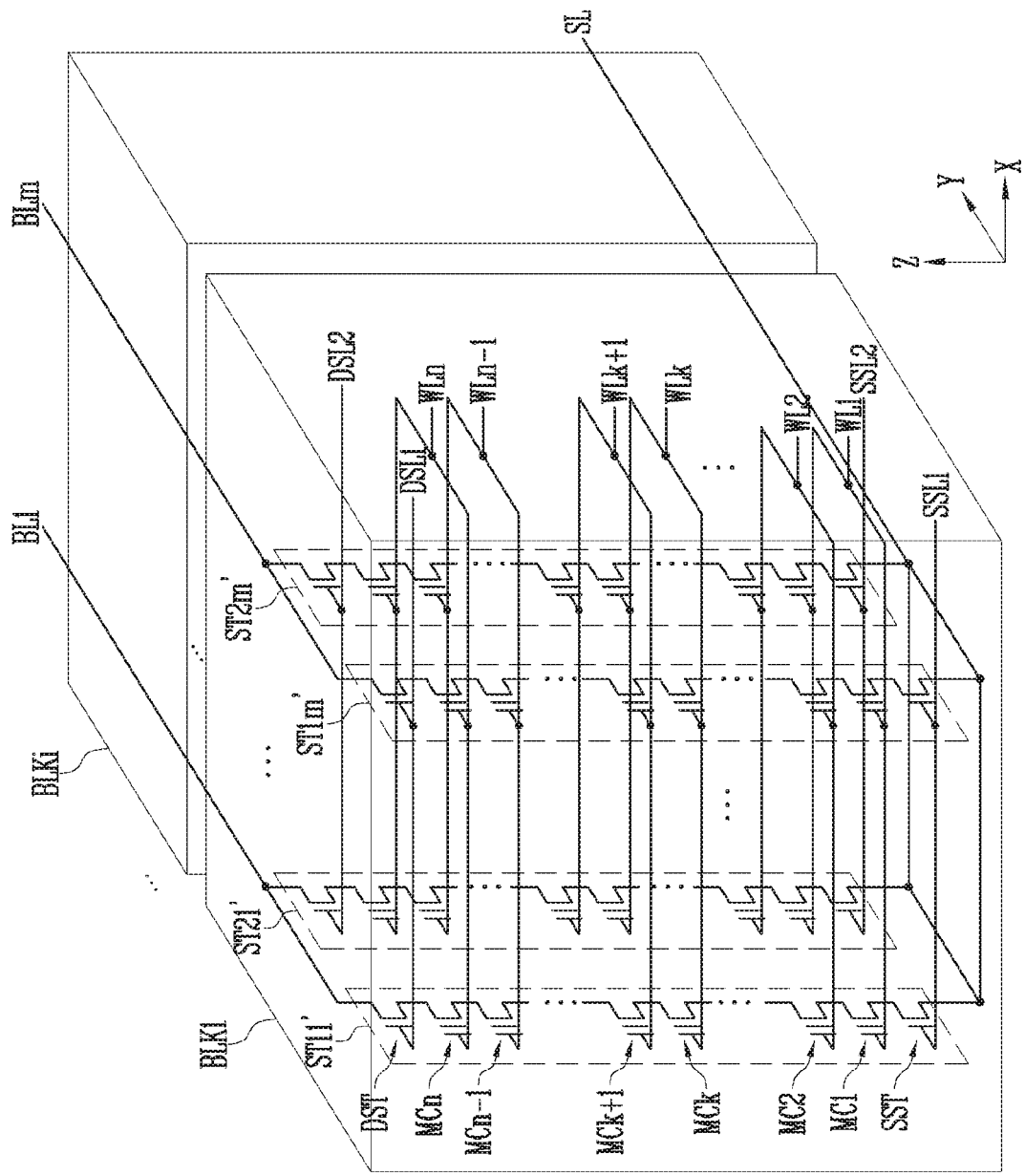
FIG. 6 is a diagram illustrating an example of a memory block having a three-dimensional (3D) structure.

FIG. 6 is a diagram illustrating an example of a memory block having a three-dimensional (3D) structure.

Referring to FIG. 6, a memory cell array 2240 of FIG. 3 may include a plurality of memory blocks BLK1 to BLKi. The first memory block BLK1, which is described by way of example, may include a plurality of strings ST11' to ST1m' and ST21' to ST2m'. Each of the strings ST11' to ST1m' and ST21' to ST2m' may extend along a vertical direction (e.g., Z direction). In the memory block BLKi, m strings may be arranged in a row direction (e.g., X direction). In FIG. 6, two strings are illustrated as being arranged in a column direction (e.g., Y direction), but this is simply an example and for clarity of illustration; three or more strings may be arranged in the column direction (e.g., Y direction) in other embodiments.

Each of the strings ST11' to ST1m' and ST21' to ST2m' may include at least one source select transistor SST, first to n-th memory cells MC1 to MCn, and at least one drain select transistor DST.

The source select transistor SST of each string may be coupled between a source line SL and the memory cells MC1 to MCn. Source select transistors of strings arranged in the same row may be coupled to the same source select line. The source select transistors of the strings ST11' to ST1m' arranged in a first row may be coupled to a first source select line SSL1. The source select transistors of the strings ST21' to ST2m' arranged in a second row may be coupled to a second source select line SSL2. In an embodiment, the source select transistors of the strings ST11' to ST1m' and ST21' to ST2m' may be coupled in common to one source select line.

The first to n-th memory cells MC1 to MCn in each string may be coupled in series between the source select transistor SST and the drain select transistor DST. Gates of the first to n-th memory cells MC1 to MCn may be coupled to first to n-th word lines WL1 to WLn, respectively.

In an embodiment, at least one of the first to n-th memory cells MC1 to MCn may be used as a dummy memory cell. When a dummy memory cell is provided, the voltage or current of the corresponding string may be stably controlled. Thereby, the reliability of data stored in the first memory block BLK1 may be improved.

The drain select transistor DST of each string may be coupled between the corresponding bit line and the memory cells MC1 to MCn. The drain select transistors DST of strings arranged in the row direction may be coupled to a drain select line extending along the row direction. The drain select transistors DST of the strings ST11' to ST1m' in the first row may be coupled to a first drain select line DSL1. The drain select transistors DST of the strings ST21' to ST2m' in the second row may be coupled to a second drain select line DSL2.

That is, the first memory block BLK1 of FIG. 6 may be configured similarly to that of the first memory block BLK1 of FIG. 5 except that a pipe transistor PT is excluded from each string.

Figure 7:
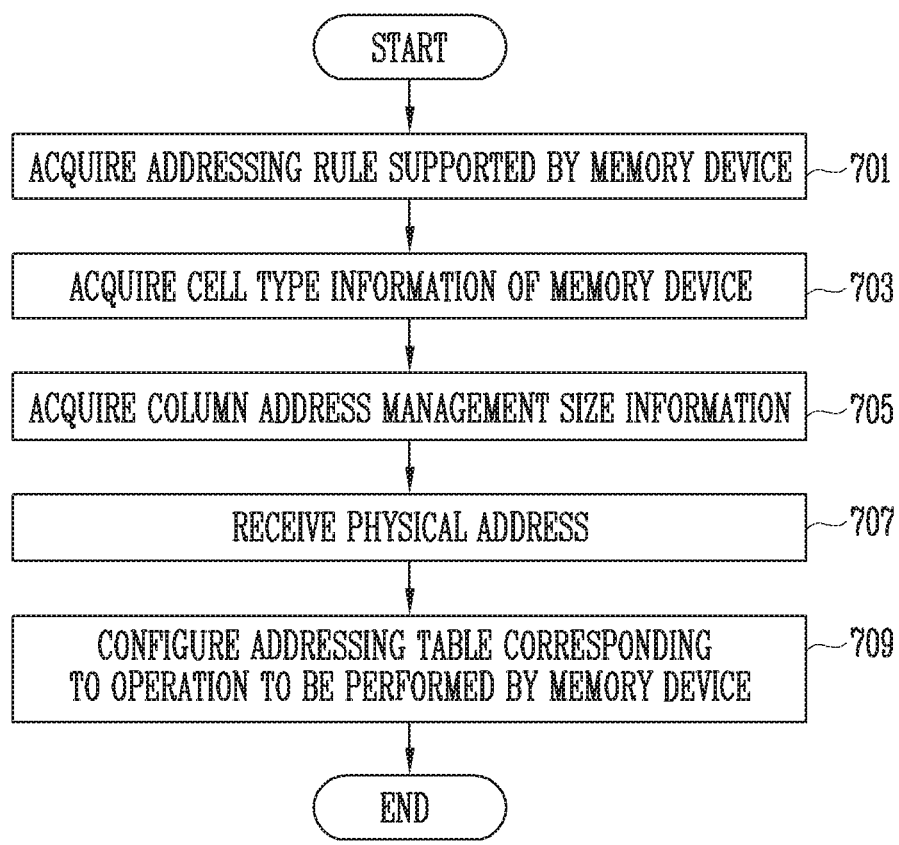
FIG. 7 is a flowchart illustrating an addressing method in accordance with an embodiment of the present disclosure.

FIG. 7 is a flowchart illustrating an addressing method in accordance with an embodiment of the present disclosure. The addressing method of FIG. 7 may be performed by the memory system 2000 of FIG. 2.

Referring to FIG. 7, at step 701, an addressing component 2150 of FIG. 2 may acquire an addressing rule supported by a memory device 2200, among a plurality of addressing rules. For example, the addressing component 2150 acquires information about the number of address bus cycles to be used by the memory device, the number of bits to be used to represent an address, and the positions of bits representing the address. The addressing rule may be received from either a central processing unit (CPU) 2160 or the memory device 2200.

At step 703, the addressing component 2150 may acquire information about the cell type of the memory device 2200. For example, the addressing component 2150 acquires information about whether the cell type of the memory device 2200 is an SLC type, an MLC type or a TLC type. The cell type information may be received from either the CPU 2160 or the memory device 2200.

At step 705, the addressing component 2150 may acquire information about a column address management size. For example, the addressing component 2150 acquires information about what the column address management size of a memory controller 2100 is. The column address management size information may be received from the CPU 2160.

At step 707, the addressing component 2150 may receive a physical address corresponding to an operation that is to be performed by the memory device 2200. For example, the physical address includes information about at least one of a column, a page, a plane, a block, and a logical unit number (LUN). The physical address may be received from the CPU 2160.

At step 709, the addressing component 2150 may configure an addressing table corresponding to the operation that is to be performed by the memory device 2200. For example, the addressing component 2150 configures the addressing table corresponding to the operation that is to be performed by the memory device 2200, based on the addressing rule supported by the memory device 2200, the cell type information of the memory device 2200, and/or column address management size information of the memory controller 2100. The addressing component 2150 may address the memory device 2200 using the configured addressing table.

FIG. 8 is a diagram illustrating an example of an addressing rule acquired from a memory device, and FIG. 9 is a diagram representing the addressing rule, illustrated in FIG. 8, in the form of a table.

Referring to FIG. 8, information regarding the addressing rule may include information about each of a plurality of addresses and/or information about an address bus cycle. The address information may include at least one of information about the number of bits allocated to represent the corresponding address and information about bit positions representing the corresponding address. The addresses may include a column address and a row address. The row address may include a page address, a plane address, a block address, and/or a logical unit number (LUN) address. The address bus cycle information may include information about the number of bus cycles to be used when addressing the memory device 2200 of FIG. 2.

Referring to FIGS. 8 and 9, the addressing rule acquired from the memory device 2200 indicates that a 16-bit length is allocated to represent a column address, and bits representing the column address are allocated to positions ranging from A0 to A15, i.e., A[15:0].

Also, the addressing rule indicates that a 12-bit length is allocated to represent a page address, and bits representing the page address are allocated to positions ranging from A16 to A27, i.e., A[27:16].

Further, the addressing rule indicates that a 4-bit length is allocated to represent a plane address, and bits representing the plane address are allocated to positions ranging from A28 to A31, i.e., A[31:28].

Furthermore, the addressing rule indicates that a 14-bit length is allocated to represent a block address, and bits representing the block address are allocated to positions ranging from A32 to A45, i.e., A[45:32].

In addition, the addressing rule indicates that a 2-bit length allocated to represent a LUN address, and bits representing the LUN address are allocated to positions ranging from A46 to A47, i.e., A[47:46].

In addition, the addressing rule indicates that the number of address bus cycles to be used by the memory device 2200 is 6.

FIG. 10 is a diagram illustrating an addressing table configured according to the addressing rule illustrated in FIGS. 8 and 9.

In FIG. 10, for convenience, a physical address received from a central processing unit (CPU) 2160 of FIG. 2 is represented by a decimal number. The physical address received from the CPU 2160 is configured such that a page address is '100', a plane address is '2', a block address is '4', and an LUN address is '0'.

The page address, represented by the decimal number '100', may be represented by a binary number of '1100100'. Since 12 bits are allocated to represent a page address in the embodiment described with reference to FIGS. 8 and 9, the binary number of '1100100' may be converted into a binary number of '000001100100'. In addition, in the illustrated embodiment described with reference to FIGS. 8 and 9, bits representing the page address are allocated to positions ranging from A16 to A27, and thus the page address of '000001100100' may be inserted into the corresponding positions.

The plane address, represented by the decimal number '2', may be represented by a binary number of '10'. Since 4 bits are allocated to represent a plane address in the embodiment described with reference to FIGS. 8 and 9, the binary number of '10' may be converted into a binary number of '0010'. Further, in the embodiment described with reference to FIGS. 8 and 9, bits representing the plane address are allocated to positions ranging from A28 to A31, and thus the plane address of '0010' may be inserted into the corresponding positions.

The block address, represented by the decimal number '4', may be represented by a binary number of '100'. Since 14 bits are allocated to represent a block address in the embodiment described with reference to FIGS. 8 and 9, the binary number of '100' may be converted into a binary number of '00000000000100'. Furthermore, in the embodiment described with reference to FIGS. 8 and 9, bits representing the block address are allocated to positions ranging from A32 to A45, and thus the block address of '00000000000100' may be inserted into the corresponding positions.

The LUN address, represented by the decimal number '0', may be represented by a binary number of '0'. Since 2 bits are allocated to represent an LUN address in the embodiment described with reference to FIGS. 8 and 9, the binary number of '0' may be converted into a binary number of '00'. Furthermore, in the embodiment described with reference to FIGS. 8 and 9, bits representing the LUN address are allocated to positions ranging from A46 to A47, and thus the LUN address of '00' may be inserted into the corresponding positions.

FIG. 11 is a diagram illustrating an example of an addressing rule acquired from a memory device, for example, the memory device 2200 of FIG. 2, and FIG. 12 is a diagram illustrating the addressing rule, illustrated in FIG. 11, in the form of a table.

Referring to FIGS. 11 and 12, the addressing rule acquired from the memory device 2200 indicates that a 14-bit length is allocated to represent a column address, and bits representing the column address are allocated to positions ranging from A0 to A13, i.e., A[13:0].

The addressing rule indicates that a 10-bit length is allocated to represent a page address, and bits representing the page address are allocated to positions ranging from A14 to A23, i.e., A[23:14].

The addressing rule indicates that a 2-bit length is allocated to represent a plane address, and bits representing the plane address are allocated to positions ranging from A24 to A25, i.e., A[25:24].

The addressing rule indicates that a 10-bit length is allocated to represent a block address, and bits representing the block address are allocated to positions ranging from A26 to A35, i.e., A[35:26].

The addressing rule indicates that a 2-bit length is allocated to represent an LUN address, and bits representing the LUN address are allocated to positions ranging from A36 to A37, i.e., A[37:36].

The addressing rule indicates that the number of address bus cycles to be used by the memory device 2200 is 5.

In addition, 2 bits 1202, each denoted by 'L'' in FIG. 12, may be inserted so as to indicate a boundary between a column address and a row address (or a page address). The bits 1202 may be set to '0' when addressing is performed.

FIG. 13 is a diagram illustrating an example of an addressing table configured according to the addressing rule illustrated in FIGS. 11 and 12.

In FIG. 13, for convenience, a physical address received from a central processing unit (CPU) 2160 of FIG. 2 is represented by a decimal number. The physical address received from the CPU 2160 is configured such that a page address is '100', a plane address is '2', a block address is '4', and an LUN address is '0'.

The page address, represented by the decimal number '100', may be represented by a binary number of '1100100'. Since 10 bits are allocated to represent a page address in the embodiment described with reference to FIGS. 11 and 12, the binary number of '1100100' may be converted into a binary number of '0001100100'. In addition, in the embodiment described with reference to FIGS. 11 and 12, bits representing the page address are allocated to positions ranging from A14 to A23, and thus the page address of '0001100100' may be inserted into the corresponding positions.

The plane address, represented by the decimal number '2', may be represented by a binary number of '10'. Since 2 bits are allocated to represent a plane address in the embodiment described with reference to FIGS. 11 and 12, the binary number of '10' may be maintained without change. Further, in the embodiment described with reference to FIGS. 11 and 12, bits representing the plane address are allocated to positions ranging from A24 to A25, and thus the plane address of '10' may be inserted into the corresponding positions.

The block address, represented by the decimal number '4', may be represented by a binary number of '100'. Since 10 bits are allocated to represent a block address in the embodiment described with reference to FIGS. 11 and 12, the binary number of '100' may be converted into a binary number of '0000000100'. Furthermore, in the embodiment described with reference to FIGS. 11 and 12, bits representing the block address are allocated to positions ranging from A26 to A35, and thus the block address of '0000000100' may be inserted into the corresponding positions.

The LUN address, represented by the decimal number '0', may be represented by a binary number of '0'. Since 2 bits are allocated to represent an LUN address in the embodiment described with reference to FIGS. 11 and 12, the binary number of '0' may be converted into a binary number of '00'. Furthermore, in the embodiment described with reference to FIGS. 11 and 12, bits representing the LUN address are allocated to positions ranging from A36 to A37, and thus the LUN address of '00' may be inserted into the corresponding positions.

Figure 14:
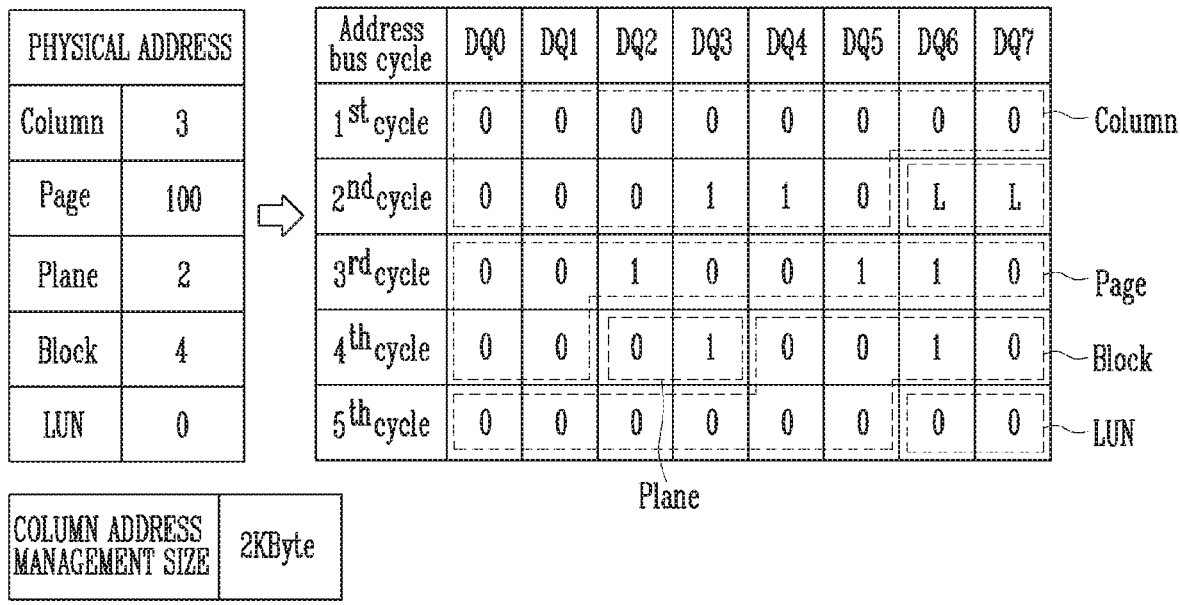
FIG. 14 is a diagram illustrating an example of an addressing table configured according to the exemplary addressing rule illustrated in FIGS. 11 and 12.

FIG. 14 is a diagram illustrating an example of an addressing table configured according to the addressing rule illustrated in FIGS. 11 and 12.

In the same way as that described with reference to FIG. 13, FIG. 14 illustrates a case where a physical address received from a central processing unit (CPU) 2160 of FIG. 2 is represented by a decimal number and where the physical address received from the CPU 2160 is configured such that a page address is '100', a plane address is '2', a block address is '4', and an LUN address is '0'.

With reference to FIG. 14, an example in which an addressing table is configured by additionally considering column address management size information will be described, but without repeating description of features identical to those of FIG. 13.

In FIG. 14, it is assumed that a column address management size is 2 Kbytes and that the column address, included in a physical address received from the CPU 2160, is a decimal number of '3'.

In this case, the addressing component 2150 may convert the column address received from the CPU 2160 depending on the column address management size. For example, the column address represented by the decimal number of '3' is converted into a decimal number of '6144' based on the column address management size 2 Kbytes, i.e., a calculation of (2×1024×3). Also, the decimal number of '6144' may be converted into a binary number of '1100000000000'.

In the embodiment described with reference to FIGS. 11 and 12, 14 bits are allocated to represent a column address, and thus the binary number of '1100000000000' may be converted into a binary number of '01100000000000'. In the embodiment described with reference to FIGS. 11 and 12, bits representing a column address are allocated to positions ranging from A0 to A13, and thus the column address of '01100000000000' may be inserted into the corresponding positions.

Figure 15:
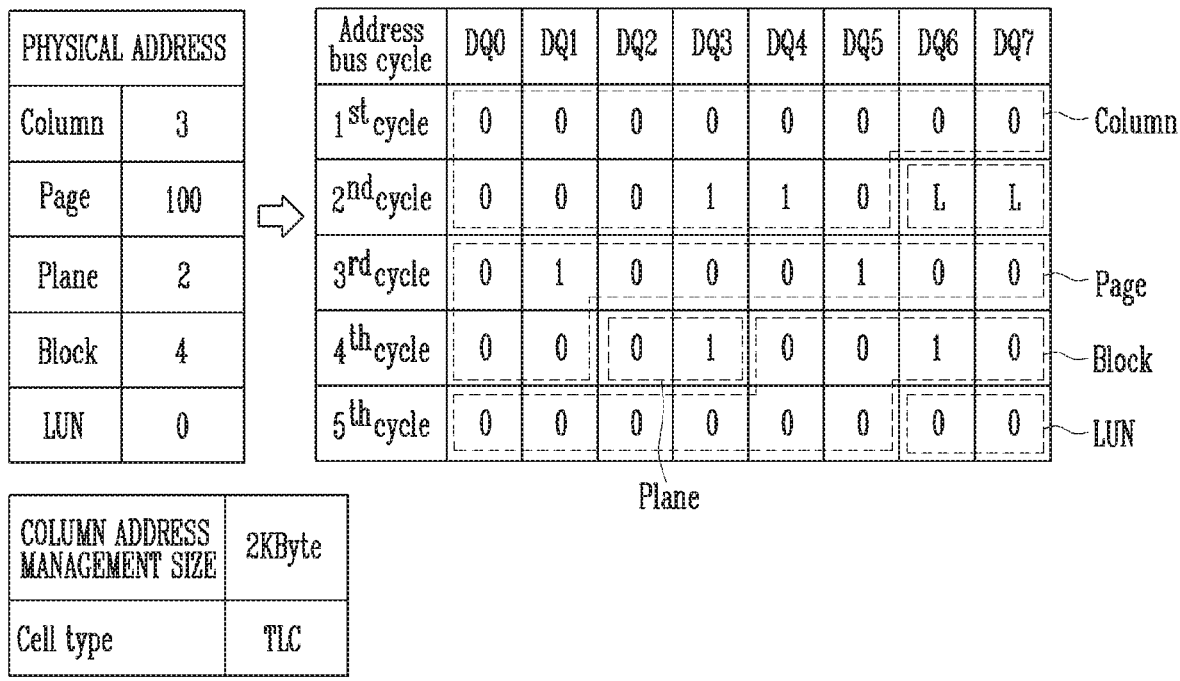
FIG. 15 is a diagram illustrating an example of an addressing table configured according to the exemplary addressing rule illustrated in FIGS. 11 and 12.

FIG. 15 is a diagram illustrating an example of an addressing table configured according to the addressing rule illustrated in FIGS. 11 and 12.

In the same way as that described with reference to FIG. 14, FIG. 15 illustrates a case where a physical address received from a central processing unit (CPU) 2160 is represented by a decimal number, and where the physical address received from the CPU 2160 is configured such that a column address is '3', a page address is '100', a plane address is '2', a block address is '4', and an LUN address is '0'. Further, a case where a column address management size is 2 Kbytes is illustrated.

With reference to FIG. 15, an example in which an addressing table is configured by additionally considering the cell type of the memory device 2200 will be described, but without repeating description of features identical to those of FIG. 14.

In FIG. 15, the memory device 2200 is assumed to be a triple-level cell (TLC) type memory device.

In this case, the addressing component 2150 may convert the page address, included in the row address received from the CPU 2160, depending on the cell type of the memory device 2200. For example, the TLC type is configured such that three logical pages are present in one physical page, and thus a page address of '100' represented by a decimal number may be converted into a decimal number of '34'. The decimal number of '34' may be converted into a binary number of '100010'.

In the embodiment described with reference to FIGS. 11 and 12, 10 bits are allocated to represent a page address, and thus the binary number of '100010' may be converted into a binary number of '0000100010'. In addition, in the embodiment described with reference to FIGS. 11 and 12, bits representing the page address are allocated to positions ranging from A14 to A23, and thus the page address of '0000100010' may be inserted into the corresponding positions.

Figure 16:
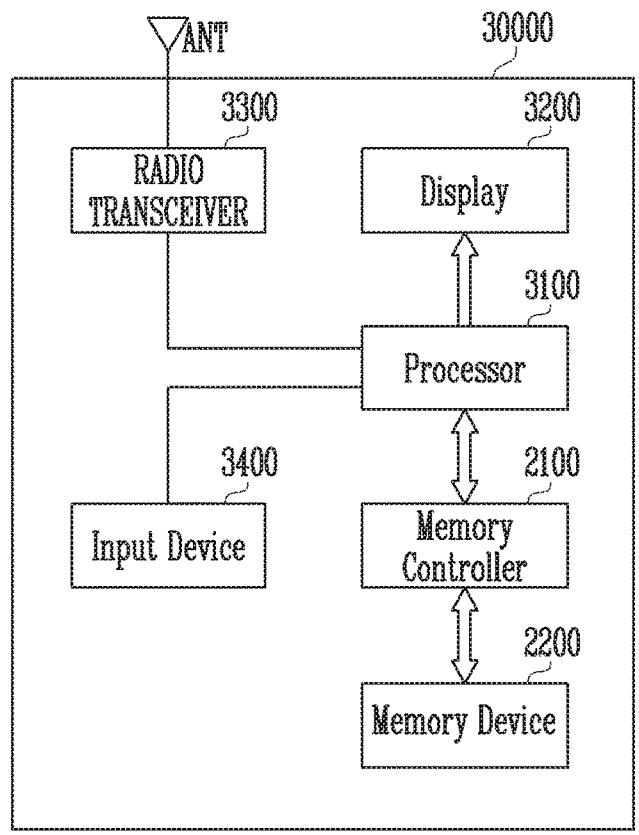
FIG. 16 is a diagram illustrating a memory system including a memory controller in accordance with an embodiment of the present disclosure.

FIG. 16 is a diagram illustrating a memory system 30000 including a memory controller in accordance with an embodiment of the present disclosure, for example, the memory controller 2100 of FIGS. 1 and 2.

Referring to FIG. 16, the memory system 30000 may be implemented as a cellular phone, a smartphone, a tablet personal computer (PC), a PC, a personal digital assistant (PDA) or a wireless communication device. The memory system 30000 may include a memory device 2200 and the memory controller 2100 that is capable of controlling the operation of the memory device 2200.

The memory controller 2100 may control a data access operation, e.g., a program, erase, or read operation, of the memory device 2200 under the control of a processor 3100.

Data programmed in the memory device 2200 may be output through a display 3200 under the control of the memory controller 2100.

A radio transceiver 3300 may transmit and receive radio signals through an antenna ANT. For example, the radio transceiver 3300 may convert a radio signal received through the antenna ANT into a signal which may be processed by the processor 3100. Therefore, the processor 3100 may process a signal output from the radio transceiver 3300 and transmit the processed signal to the memory controller 2100 or the display 3200. The memory controller 2100 may transmit a signal processed by the processor 3100 to the memory device 2200. Furthermore, the radio transceiver 3300 may convert a signal output from the processor 3100 into a radio signal, and output the converted radio signal to the external device through the antenna ANT. An input device 3400 may be used to input a control signal for controlling the operation of the processor 3100 or data to be processed by the processor 3100. The input device 3400 may be implemented as a pointing device such as a touch pad or a computer mouse, a keypad or a keyboard. The processor 3100 may control the operation of the display 3200 such that data output from the memory controller 2100, data output from the radio transceiver 3300, or data output from the input device 3400 is output through the display 3200.

In an embodiment, the memory controller 2100 capable of controlling the operation of the memory device 2200 may be implemented as a part of the processor 3100 or as a chip provided separately from the processor 3100.

Figure 17:
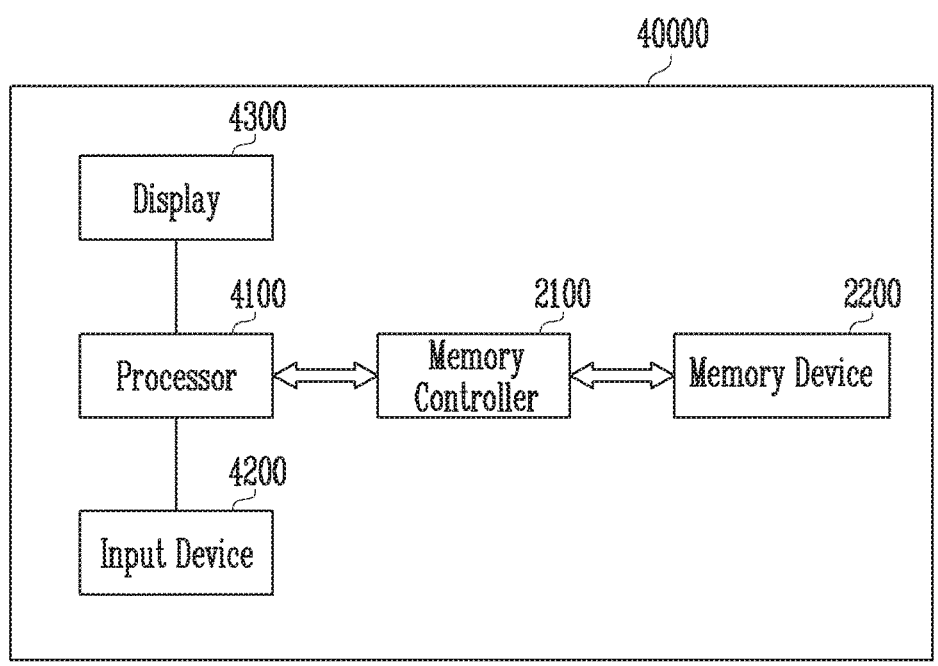
FIG. 17 is a diagram illustrating a memory system including a memory controller in accordance with an embodiment of the present disclosure.

FIG. 17 is a diagram illustrating a memory system 40000 including a memory controller in accordance with an embodiment of the present disclosure, for example, the memory controller 2100 of FIGS. 1 and 2.

Referring to FIG. 17, the memory system 40000 may be embodied in a personal computer, a tablet PC, a PC, a net-book, an e-reader, a personal digital assistant (PDA), a portable multimedia player (PMP), an MP3 player, or an MP4 player.

The memory system 40000 may include a memory device 2200 and the memory controller 2100 that is capable of controlling the data processing operation of the memory device 2200.

A processor 4100 may output data stored in the memory device 2200 through a display 4300, according to data input from an input device 4200. For example, the input device 4200 may be implemented as a point device such as a touch pad or a computer mouse, a keypad or a keyboard.

The processor 4100 may control the overall operation of the memory system 40000 and control the operation of the memory controller 2100. In an embodiment, the memory controller 2100 capable of controlling the operation of the memory device 2200 may be implemented as a part of the processor 4100 or as a chip provided separately from the processor 4100.

Figure 18:
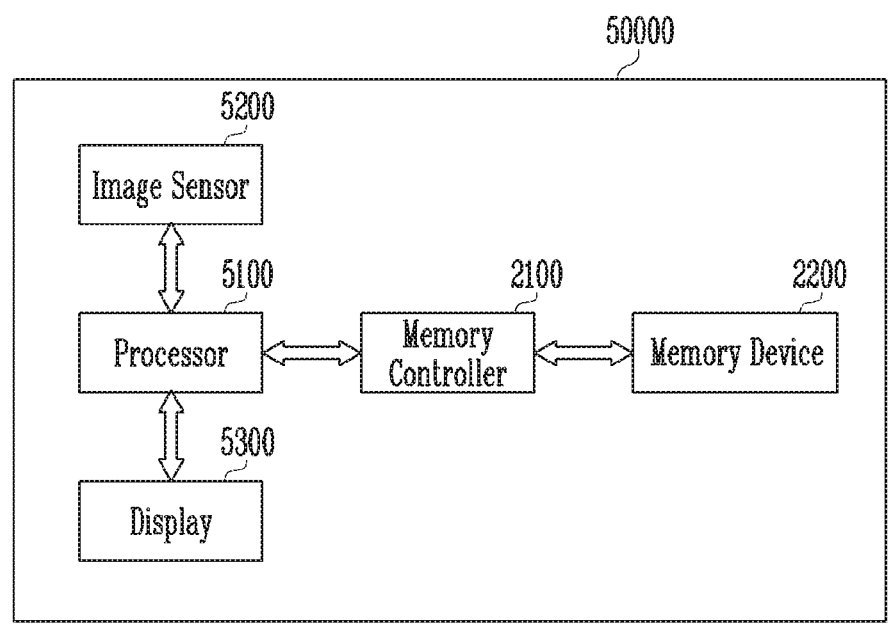
FIG. 18 is a diagram illustrating a memory system including a memory controller in accordance with an embodiment of the present disclosure.

FIG. 18 is a diagram illustrating a memory system 50000 including a memory controller in accordance with an embodiment of the present disclosure, for example, the memory controller 2100 of FIGS. 1 and 2.

Referring to FIG. 18, the memory system 50000 may be embodied in an image processing device, e.g., a digital camera, a portable phone provided with a digital camera, a smartphone provided with a digital camera, or a tablet personal computer (PC) provided with a digital camera.

The memory system 50000 may include a memory device 2200 and the memory controller 2100 that is capable of controlling a data processing operation, e.g., a program, erase, or read operation, of the memory device 2200.

An image sensor 5200 of the memory system 50000 may convert an optical image into digital signals. The converted digital signals may be transmitted to a processor 5100 or the memory controller 2100. Under the control of the processor 5100, the converted digital signals may be output through a display 5300 or stored in the memory device 2200 through the memory controller 2100. Data stored in the memory device 2200 may be output through the display 5300 under the control of the processor 5100 or the memory controller 2100.

In an embodiment, the memory controller 2100 capable of controlling the operation of the memory device 2200 may be implemented as a part of the processor 5100, or as a chip provided separately from the processor 5100.

Figure 19:
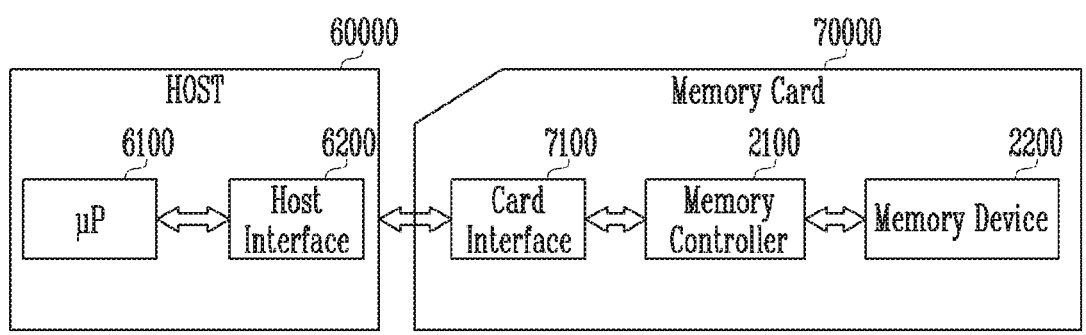
FIG. 19 is a diagram illustrating a memory system including a memory controller in accordance with an embodiment of the present disclosure.

FIG. 19 is a diagram illustrating a memory system 70000 including a memory controller in accordance with an embodiment of the present disclosure, for example, the memory controller 2100 of FIGS. 1 and 2.

Referring to FIG. 19, the memory system 70000 may be embodied in a memory card or a smart card. The memory system 70000 may include a memory controller 2100, a memory device 2200 and a card interface 7100.

The memory controller 2100 may control data exchange between the memory device 2200 and the card interface 7100. In an embodiment, the card interface 7100 may be a secure digital (SD) card interface or a multi-media card (MMC) interface, but it is not limited thereto.

The card interface 7100 may interface data exchange between a host 60000 and the memory controller 2100 according to a protocol of the host 60000. In an embodiment, the card interface 7100 may support a universal serial bus (USB) protocol, and an interchip (IC)-USB protocol. Here, the card interface 7100 may refer to hardware capable of supporting a protocol which is used by the host 60000, software installed in the hardware, or a signal transmission method.

When the memory system 70000 is connected to a host interface 6200 of the host 60000 such as a personal computer (PC), a tablet PC, a digital camera, a digital audio player, a cellular phone, console video game hardware or a digital set-top box, the host interface 6200 may perform data communication with the memory device 2200 through the card interface 7100 and the memory controller 2100 under the control of a microprocessor (μP) 6100.

In accordance with embodiments of the present disclosure, hardware for performing addressing is used, and thus the address translation speed of a memory system may be improved.

While various embodiments of the present disclosure have been described and illustrated, those skilled in the art will appreciate, in light of the present disclosure, that various modifications, additions and substitutions are possible. Therefore, the scope of the present disclosure is defined by the appended claims and equivalents thereof rather than by the description preceding them.

What is claimed is:

1. A memory controller, comprising:
a central processing unit (CPU) configured to translate a logical address corresponding to an operation that is to be performed by a memory device into a physical address; and
an addressing component configured to acquire information about an addressing rule supported by the memory device, among a plurality of addressing rules, from the central processing unit (CPU), and to configure an addressing table corresponding to the operation using the acquired addressing rule information and the physical address,
wherein the addressing rule information comprises information about a number of address bus cycles to be used by the memory device,
wherein the addressing rule information comprises information about a number of bits, among a plurality of bits included in the addressing table, allocated to represent one address among a plurality of addresses corresponding to the physical address,
wherein the addressing rule information comprises information about allocated locations in the addressing table for representing the one address, and
wherein the addressing component is configured to configure the addressing table by arranging a position of a column address and a position of a row address in the addressing table based on the number of address bus cycles.

2. The memory controller according to claim 1, wherein the addressing component is configured to additionally acquire information about a cell type of the memory device and configure the addressing table in consideration of the acquired cell type information.

3. The memory controller according to claim 2, wherein the addressing component is configured to convert a page address, included in the physical address based on the cell type information.

4. The memory controller according to claim 1, wherein the addressing component is configured to convert the column address, included in the physical address based on the number of address bus cycles.

5. The memory controller according to claim 1, wherein the address bus cycles supported by the memory device are variably set for each memory device.

6. The memory controller according to claim 1, wherein the addressing rule information comprises information about the number of bits allocated to represent at least one of the column address and the row address.

7. The memory controller according to claim 6, wherein the row address includes at least one of a page address, a plane address, a block address, and a logical unit number (LUN) address.

8. The memory controller according to claim 7, wherein the addressing rule information comprises information about the bit positions allocated to at least one of the column address, the page address, the plane address, the block address, and the LUN address.

9. A memory system, comprising:
a memory device; and
a memory controller configured to acquire information about an addressing rule supported by the memory device, among a plurality of addressing rules, and to configure an addressing table, corresponding to an operation that is to be performed by the memory device, using the acquired addressing rule information, wherein the addressing rule information comprises information about a number of address bus cycles to be used by the memory device, wherein the addressing rule information comprises information about a number of bits, among a plurality of bits included in the addressing table, allocated to represent one address among a plurality of addresses corresponding to a physical address for the operation, and wherein the addressing rule information comprises information about allocated locations in the addressing table for representing the one address, and wherein the memory controller is configured to configure the addressing table by arranging a position of a column address and a position of a row address in the addressing table based on the number of address bus cycles.

10. The memory system according to claim 9, wherein the memory controller is configured to additionally acquire information about a cell type of the memory device and configure the addressing table in consideration of the acquired cell type information.

11. The memory system according to claim 10, wherein the memory controller is configured to convert a page address, included in the physical address based on the cell type information.

12. The memory system according to claim 9, wherein the memory controller is configured to configure the addressing table by additionally considering information about a column address management size of the memory controller.

13. The memory system according to claim 12, wherein the memory controller is configured to convert the column address, included in the physical address based on the column address management size information.

14. The memory system according to claim 9, wherein the address bus cycles supported by the memory device are variably set for each memory device.

15. The memory system according to claim 9, wherein the addressing rule information comprises information about the number of bits allocated to represent at least one of the column address and the row address.

16. The memory system according to claim 15, wherein the row address includes at least one of a page address, a plane address, a block address, and a logical unit number (LUN) address.

17. The memory system according to claim 16, wherein the addressing rule information comprises information about the bit positions allocated to at least one of the column address, the page address, the plane address, the block address, and the LUN address.

18. A method of operating a memory system, comprising:

translating a logical address corresponding to an operation that is to be performed by a memory device into a physical address, using a processor of the memory system;

acquiring information about an addressing rule supported by the memory device, among a plurality of addressing rules, using an addressing component of the memory system; and configuring an addressing table corresponding to the operation using the physical address and the acquired addressing rule information, using the addressing component, wherein the addressing rule information comprises information about a number of address bus cycles to be used by the memory device, wherein the addressing rule information comprises information about a number of bits, among a plurality of bits included in the addressing table, allocated to represent one address among a plurality of addresses corresponding to the physical address, wherein the addressing rule information comprises information about allocated locations in the addressing table for representing the one address, and wherein the configuring the addressing table comprises arranging a position of a column address and a position of a row address in the addressing table based on the number of address bus cycles.

19. A memory system comprising:

a memory device; and a memory controller configured to:

receive a logical address for the memory device;

translate the logical address to a physical address including a column address and a row address for a space in the memory device;

configure an addressing table based on an addressing rule; and access the memory device based on the addressing table, wherein the addressing table includes information regarding bits of the column address and the row address to access the memory device at each of a plurality of address bus cycles, wherein the addressing rule information comprises information about a number of address bus cycles to be used by the memory device, wherein the addressing rule information comprises information about a number of bits, among a plurality of bits included in the addressing table, allocated to represent one address among a plurality of addresses corresponding to the physical address, wherein the addressing rule information comprises information about allocated locations in the addressing table for representing the one address, and wherein the memory controller is configured to configure the addressing table by arranging a position of the column address and a position of the row address in the addressing table based on the number of address bus cycles.

* * * * *